United States Patent
Lim et al.

(10) Patent No.: US 11,175,874 B2
(45) Date of Patent: Nov. 16, 2021

(54) IMAGE DISPLAY METHOD

(71) Applicant: SK TELECOM CO., LTD., Seoul (KR)

(72) Inventors: Gukchan Lim, Seoul (KR); Seungmin Seen, Seoul (KR); Yong Woo Bae, Seoul (KR); Dongyoub Sinn, Seoul (KR); Seungho Shin, Seoul (KR); Hak-Soon Lee, Seoul (KR); Jinsoo Jeon, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/649,101

(22) PCT Filed: Sep. 19, 2018

(86) PCT No.: PCT/KR2018/011044
§ 371 (c)(1),
(2) Date: Mar. 19, 2020

(87) PCT Pub. No.: WO2019/059633
PCT Pub. Date: Mar. 28, 2019

(65) Prior Publication Data
US 2020/0225899 A1    Jul. 16, 2020

(30) Foreign Application Priority Data
Sep. 19, 2017  (KR) .................. 10-2017-0120636

(51) Int. Cl.
*G09G 5/00*     (2006.01)
*G06F 3/14*     (2006.01)
(Continued)

(52) U.S. Cl.
CPC .......... *G06F 3/1423* (2013.01); *G06F 3/0416* (2013.01); *G06F 3/0481* (2013.01); *G06F 3/0485* (2013.01)

(58) Field of Classification Search
CPC ........ G06F 3/14; G06F 3/1446; G06F 9/3026; G09G 2300/026; G09G 2300/023;
(Continued)

(56) References Cited

U.S. PATENT DOCUMENTS 5,467,102 A      11/1995  Kuno et al.
2010/0001925 A1*  1/2010  Kim .................. G06F 3/1446
                                              345/1.3
(Continued)

FOREIGN PATENT DOCUMENTS

EP     3327581 A1 *  5/2018  .......... G06F 40/163
JP     2002-365718 A  12/2002
(Continued)

OTHER PUBLICATIONS

International Search Report dated Dec. 17, 2018 for corresponding international application No. PCT/KR2018/011044.
(Continued)

*Primary Examiner* — Jennifer T Nguyen
(74) *Attorney, Agent, or Firm* — Hauptman Ham, LLP

(57) ABSTRACT

According to one embodiment of the present disclosure, a method for displaying an image on a multi-display device including two or more displays comprises determining whether the image includes a boundary area image to be displayed over a boundary area between a first display and a second display adjacent to the first display; and inserting dummy data into the image so that the image has an increased size and the dummy data is displayed on a position corresponding to the boundary area.

7 Claims, 5 Drawing Sheets

(51) Int. Cl.
*G06F 3/041* (2006.01)
*G06F 3/0481* (2013.01)
*G06F 3/0485* (2013.01)

(58) Field of Classification Search
CPC .. G09G 5/12; G09G 2320/00; G09G 2356/00; G09G 2360/04
USPC .................................................. 345/1.1, 173
See application file for complete search history.

(56) References Cited

U.S. PATENT DOCUMENTS

| | | |
|---|---|---|
| 2010/0182247 A1 | 7/2010 | Petschnigg et al. |
| 2011/0164065 A1 | 7/2011 | Mate et al. |
| 2014/0043268 A1* | 2/2014 | Bae ....................... G06F 3/0488 |
| | | 345/173 |
| 2015/0370112 A1* | 12/2015 | Sawabe ................. G06F 3/1446 |
| | | 349/73 |
| 2016/0350052 A1 | 12/2016 | Chang |

FOREIGN PATENT DOCUMENTS

| | | |
|---|---|---|
| JP | 2014-010169 A | 1/2014 |
| JP | 2016-095378 A | 5/2016 |
| JP | 2017-003905 A | 1/2017 |
| KR | 10-2012-0114318 A | 10/2012 |

OTHER PUBLICATIONS

European Search Report dated Dec. 14, 2020, in connection with corresponding European Patent Application No. EP18857905.6.
Hae-Kwang Kim, 'Efficient Automatic Text Location Method and Content-Based Indexing and Structuring of Video Database', Journal of Visual Communication and Image Representation., vol. 7, No. 4 (Dec. 1, 1996).

* cited by examiner

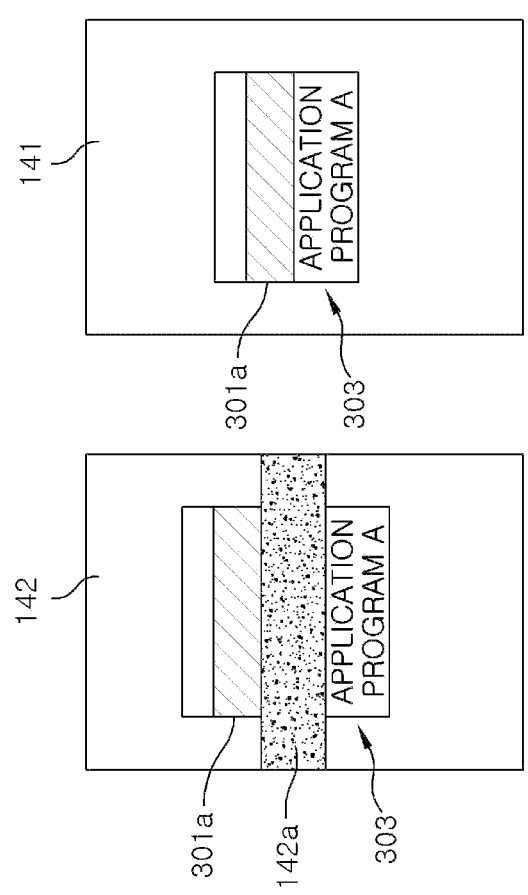

IMAGE DISPLAY METHOD

CROSS REFERENCE TO RELATED APPLICATION

The present application is a national stage filing under 35 U.S.C § 371 of PCT application number PCT/KR2018/011044 filed on Sep. 19, 2018 which is based upon and claims the benefit of priorities to Korean Patent Application No. 10-2017-0120636, filed on Sep. 19, 2017 in the Korean Intellectual Property Office, which are incorporated herein in their entireties by reference.

TECHNICAL FIELD

The present disclosure relates to an image displaying method that displays an image on a multi-display device including multiple displays.

BACKGROUND

A multi-display device displays not only various images on each of multiple displays but also one entire image by displaying divided images of the entire image on each of the multiple displays.

The multi-display device includes a distributor dividing an entire image into multiple partial images and distributing the multiple partial images to multiple displays. The distributor divides the entire image into the preset number of partial images and provides each of the partial images for each of pre-designated displays to display the entire image on the multi-display device.

However, although the multiple displays arranged as adjacent as possible, distortion inevitably occurs at a boundary area because of bezels of the multiple displays included in the boundary area.

SUMMARY

The present disclosure provides an image displaying method, at a multi-display device, that selectively modifies image data to be displayed over a boundary between displays adjacently arranged and displays the modified image.

According to one embodiment of the present disclosure, the multi-display device analyzes the image data to be displayed over the boundary between the adjacently arranged displays and selects a modification-required image that needs to be modified. By inserting dummy data into the selected modification-required image and displaying the modified image by the dummy data, a readability for an object included in the image data is improved.

For example, it is regarded that an application program window, displayed on the multi-display device, corresponding to an application program running on a computer includes a document. If the image is displayed unmodified so that letters of the document is displayed over the boundary area, the image is determined as the modification-required image. Further, displaying, avoiding the boundary area, the letters of the modification-required image improves the readability for the letters.

BRIEF DESCRIPTION OF THE DRAWINGS

FIGS. 5A to 5C show examples of a boundary area image stored in a rendering buffer, stored in a display buffer, and displayed on a multi-display device according to one embodiment of the present disclosure.

DETAILED DESCRIPTION

Figure 1:
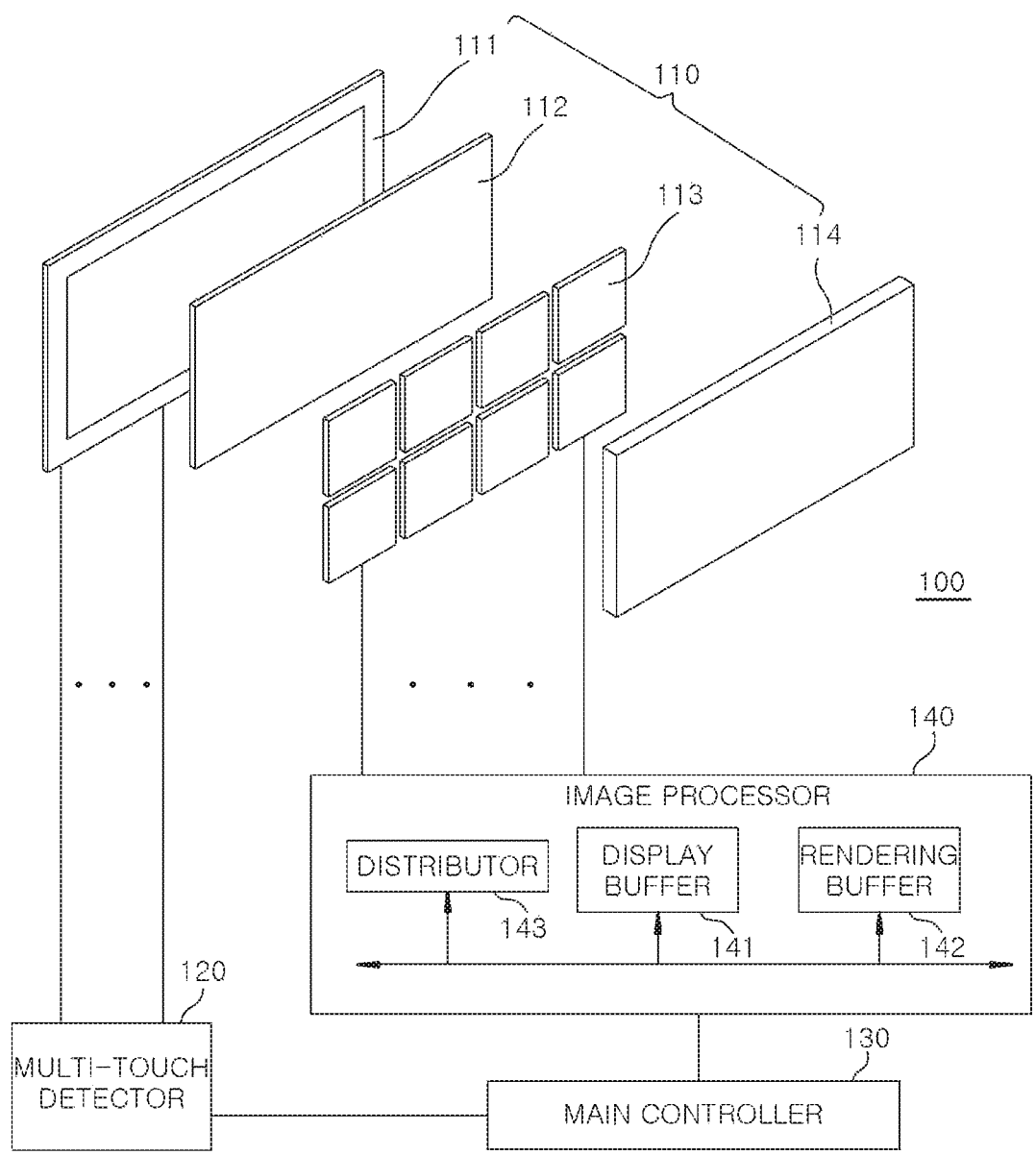
FIG. 1 shows a configuration of a multi-display device performing an image displaying method according to one embodiment of the present disclosure.

FIG. 1 shows a configuration of a multi-display device performing an image displaying method according to one embodiment of the present disclosure.

Referring to FIG. 1, the multi-display device 100 according to the one embodiment of the present disclosure includes a display unit 110, a multi-touch detector 120, a main controller 130, and an image processor 140.

The display unit 110 includes a multi-touch frame 111, a tempered glass 112, a display module 113 including multiple displays, and a wall mount bracket 114. Multiple light emitting diodes and photo sensors are arranged along an edge of the multi-touch frame 111, and if a light is emitted from a light emitting diode, an opposite photo sensor senses the light and provides the sensing the light for the multi-touch detector 120. The tempered glass 112 protects the display module 113 from breaking by external force. The display module 113 outputs, on each of the multiple displays, respective image data which corresponds to each of the multiple displays and is transmitted from the image processor 140. The wall mount bracket 114 supports the multi-touch frame 111, the tempered glass 112, and the display module 113 by fixing them to a wall. Herein, the display module 113 may be a seamless display module where a display bar which takes a form of a flexible film is further installed on a boundary area between the multiple displays.

The multi-touch detector 120 receives a multi-touch signal according to an operation for a multi-touch from the multi-touch frame 111 and transmits the received multi-touch signal to the main controller 130.

The main controller 130 determines a position of the multi-touch and various interactions based on the transmitted multi-touch signal, controls progress of image processing by the image processor 140, and allows the display unit 110 to display an image.

The main controller 130 controls at least one application program window, corresponding to at least one application program running on the multi-display device 100, to be displayed on the display module 113 of the display unit 110.

Further, the main controller 130 monitors whether an interaction event regarding a movement of the application program window occurs. The main controller 130 determines, if the interaction event occurs across the boundary area, whether there is a boundary area image to be displayed over the boundary area between the multiple displays included in the display module 113 among images displayed on the display unit 110. Herein, if two displays are adjacent right and left, the boundary area includes a boundary line between the two displays, a partial side of a right edge of a left display, and/or a partial side of a left edge of a right display. Otherwise, if two displays are adjacent up and down, the boundary area includes a boundary line between the two displays, a partial side of a lower edge of an upper display, and/or a partial side of an upper edge of a lower display. Further, an object includes a text, a character, etc. each of which has a predetermined shape. Since the object has display-coordinates of the object that is different from central-coordinates of an image including the object, the object has a property that if the display-coordinates are changed, a distance between the object and at least one of a upper side, a lower side, a left side, and a right side of the image including the object is changed.

Furthermore, the main controller 130 generates and inserts dummy data, into the boundary area image, of which position corresponds to the boundary area in the boundary area image thereby controlling the image processor 140 to increase a size of the boundary area image so that the object in the boundary area image is displayed on a position that does not include the boundary area.

On the other hand, the main controller 130 determines whether the boundary area image is a modification-required image where the object in the boundary area image needs to be modified based on an amount of change of image data in the boundary area image if there is the boundary area image to be displayed over the boundary area between the multiple displays included in the display module 113 among the images displayed on the display unit 110, and generates and inserts dummy data into the position corresponding to the boundary area in the boundary area image if the boundary area image is the modification-required image.

On the other hand, if the display module 113 is the seamless display module where the display bar that takes a form of the flexible film is further installed on the boundary area between the multiple displays, the main controller 130 may further control the seamless display module to display a similar color on the display bar to a color of an image displayed on the boundary area.

The image processor 140 processes the image to be displayed on the display unit 110 based on a control signal received from the main controller 130, and provides image data for the display module 113 by distributing the image data into each of the multiple displays included in the display unit 110. Pixel information and dummy data regarding the boundary area between multiple displays included in the display module 113 are included in a boundary area image stored in a rendering buffer 142 of the image processor 140. The dummy data is included in a boundary area image stored in a display buffer 141 of the image processor 140, but the pixel information regarding the boundary area image between the multiple displays included in the display module 113 is not included in the boundary area image stored in the display buffer 141. A distributor 143 transmits the boundary area image stored in the display buffer 141 to the display module 113 of the display unit 110.

Figure 2:
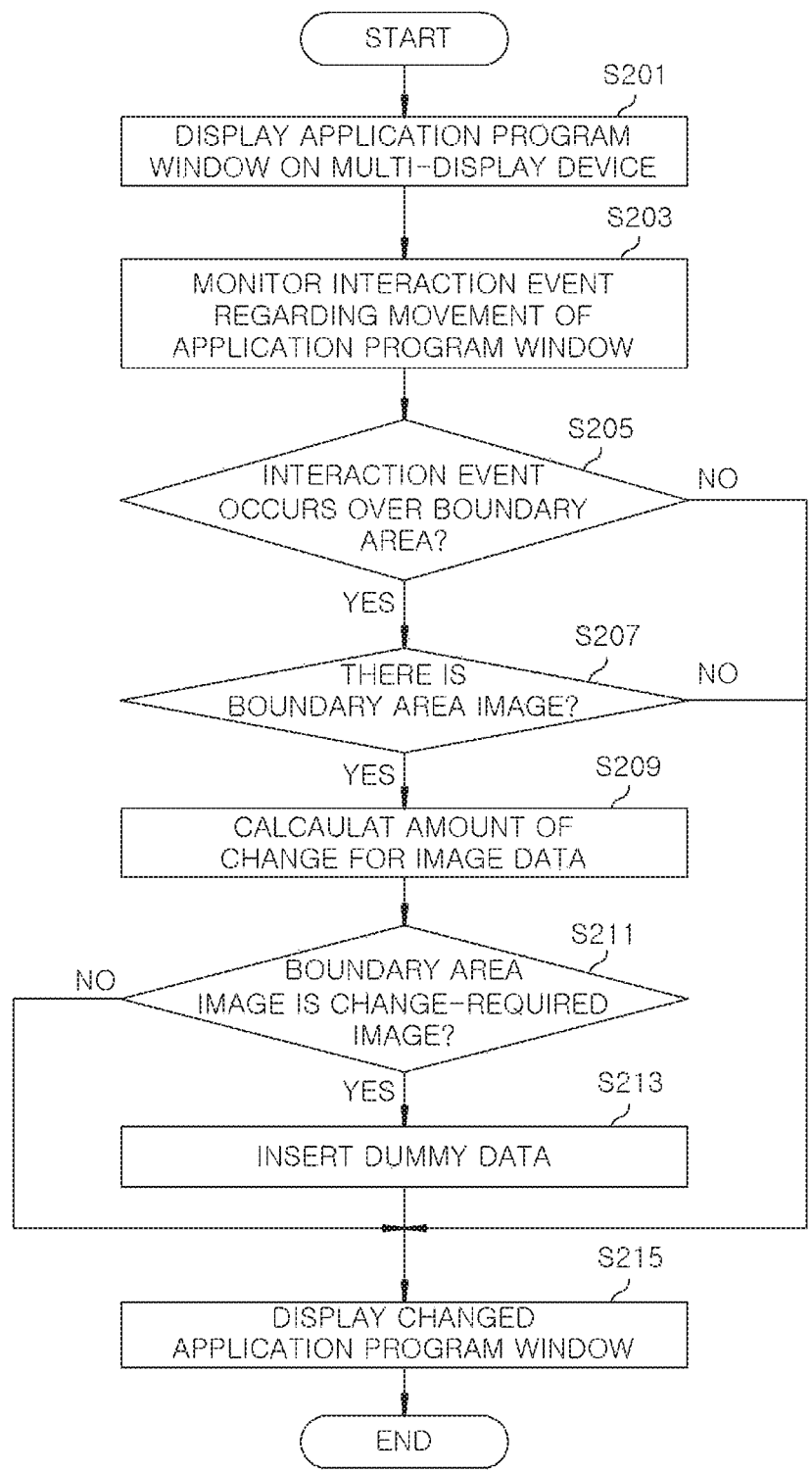
FIG. 2 shows a flowchart illustrating an image displaying method according to one embodiment of the present disclosure.

FIG. 2 shows a flowchart illustrating an image displaying method according to one embodiment of the present disclosure. For the below explanation, steps S209 and S211 are performed according to one embodiment of the present disclosure, but the steps S209 and S211 may be skipped according to another embodiment of the present disclosure. Hereinafter, to begin with, the one embodiment of the present disclosure performing the steps S209 and S211 is described.

Referring to FIG. 2, the image displaying method according to the one embodiment of the present disclosure includes a step S201 of displaying, through a display module, at least one application program window corresponding to at least one application program running on a multi-display device.

Further, the image displaying method according to the one embodiment further includes a step S203 of monitoring whether an interaction event regarding a movement of the application program window occurs.

Next, the image displaying method according to the one embodiment further includes a step S205 and a step S207 of determining, if the interaction event occurs across the boundary area in the step of monitoring, whether there is the boundary area image to be displayed over the boundary area between multiple displays included in the display module. Herein, it may be determined that there is the boundary area image if coordinates of the boundary area are included in an image display range according to overall coordinates information of an image to be displayed on the multi-display device.

In addition, the image displaying method according to the one embodiment further includes a step S209 and a step S211 of determining whether the boundary area image is a modification-required image that needs to be modified based on an amount of change of image data in the boundary area image if there is the boundary area image. Herein, an amount of change of inter-pixel data between an arbitrary pixel in the boundary area image and adjacent pixels is repeatedly calculated while repeatedly changing the arbitrary pixel for another arbitrary pixel, a data change rate of the boundary area image is calculated by using a sum or an average of the repeatedly calculated amount of change of the inter-pixel data, and whether the boundary area image is the modification-required image may be determined based on a result of comparing the calculated data change rate with a first preset threshold change rate.

Next, the image displaying method according to the one embodiment further includes a step S213 and a step S215 of generating and inserting dummy data into a position, in the boundary area image, corresponding to the boundary area if the boundary area image is the modification-required image and of displaying an object in the boundary area image on a position that does not include the boundary area. In the steps S213 and S215, the inserting the dummy data makes a size of the boundary area image increased so that a display position of the object in the boundary area image is shifted. Herein, the position into which the dummy data is inserted may be determined and inserted based on calculating a change rate of the image data for each pixel line parallel to the boundary area based on the amount of change of the image data, and a result of comparing the calculated change rate of the image data for each pixel line with a second preset threshold change rate. Further, the dummy data may be inserted to extent the application program window in a direction corresponding to the movement of the interaction event based on the boundary area.

As previously described, the steps S209 and S211 is performed according to the one embodiment, but the steps S209 and S211 may be skipped according to another embodiment. In this case, if there is the boundary area image to be displayed over the boundary area between the multiple displays in the step S207, the dummy data may be generated and inserted into the position corresponding to the boundary area in the boundary area image.

Hereinafter, the image displaying method performed by the multi-display device 100 according to one embodiment of the present disclosure is described in more detail referring to FIG. 1 through FIG. 5C.

First, a user may input an instruction that the multi-display device 100 runs an application program by touching a preset position on the multi-touch frame 111 of the multi-display device 100, and the instruction is transmitted to the main controller 130 through the multi-touch detector 120.

Figure 3A:
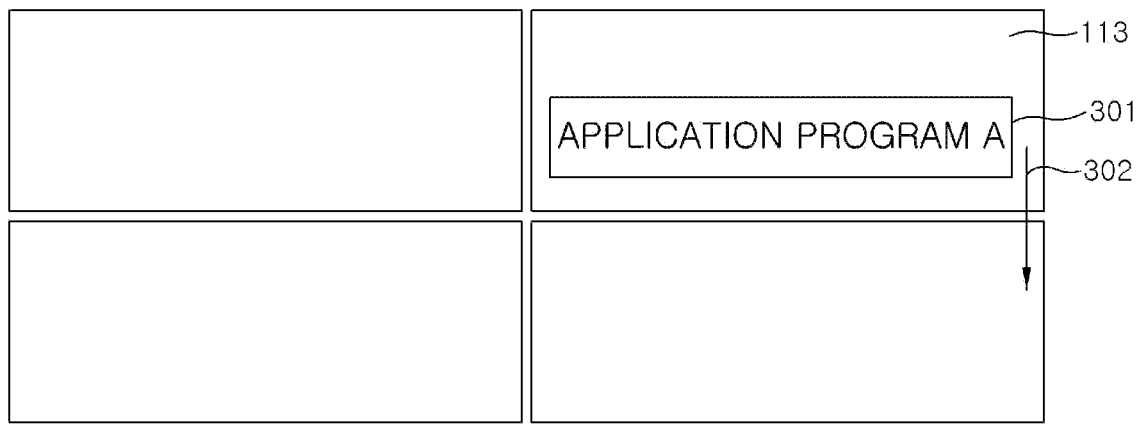
FIGS. 3A to 3C show an example of displaying a boundary area image over a multi-display device according to one embodiment of the present disclosure.

The main controller 130 therefore runs the application program corresponding to the instruction received through the multi-touch detector 120 and controls the image processor 140 to display an application program window according to the running of the application program, and images distributed to multiple displays by the image processor 140 are displayed on multiple displays included in the display unit 110 in the step S201. For example, if the user inputs an instruction running an application program A, an application program window 301 corresponding to the application program A is displayed as illustrated in FIG. 3A. Herein, an initial position displaying the application program window 301 is illustrated as just an example.

In the step S203, the main controller 130 monitors whether an interaction event regarding a movement of the application program window occurs in a situation that the distributed images are displayed on the display unit 110 of the multi-display device 100.

Herein, to change the position of the application program window 301 displayed on the multi-touch frame 111 of the multi-display device 100, the user makes a dragging input 302 onto the application program window 301 or makes a preset input so that the interaction event regarding the movement of the application program window 301 may be occurred. In that case, a signal regarding the occurred interaction event is transmitted to the main controller 130 through the multi-touch detector 120.

Next, the main controller 130 determines whether the interaction event occurs across a boundary area between the multiple displays included in the display module 113. For example, in the step S205, whether the interaction event occurs across the boundary area between multiple displays may be determined based on a result of comparing coordinates information on the dragging input 302 with coordinates information on the boundary area.

Figure 3B:
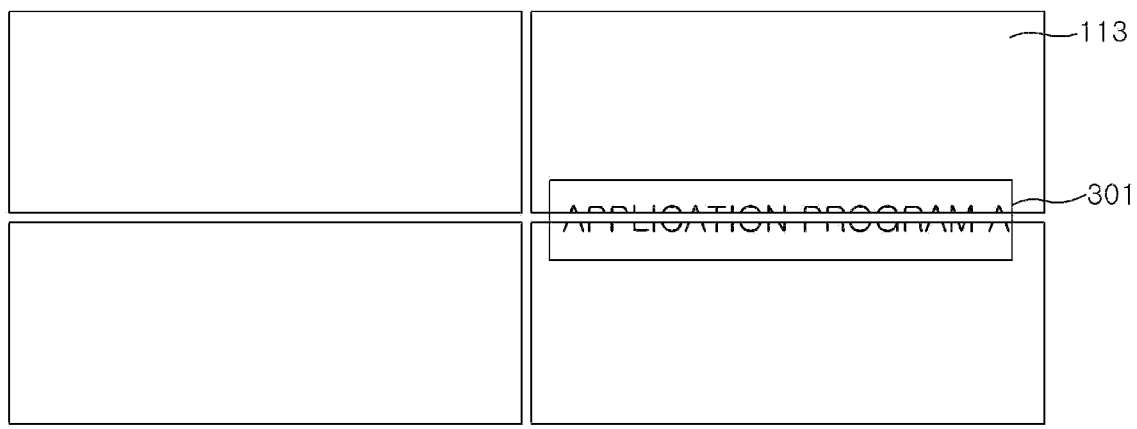

Next, if the main controller 130 determines that the interaction event occurs across the boundary area between the multiple displays included in the display module 113, the main controller 130 determines whether there is a boundary area image to be displayed over the boundary area between the multiple displays included in the display module 113. Herein, the main controller 130 determines that there is the boundary area image if coordinates of the boundary area are included in an image display range according to overall coordinates information on an image to be displayed on the multi-display device 100. For example, it may be determined that there is the boundary area image if, by the dragging input 302 in FIG. 3A, the application program window 301 is displayed as illustrated in FIG. 3B. Further, if it can be known that an image is displayed over multiple displays like a situation that a present display mode of the multi-display device 100 is a full screen mode displaying the image over all of the multiple displays, determining whether there is the boundary area image may be skipped because the boundary area image exists necessarily. The one embodiment described referring FIG. 2 is described that determining whether there is the boundary area image is performed if the main controller 130 determines that the interaction event occurs across the boundary area between the multiple displays included in the display module 113, however, the main controller 130 may determine whether there is the boundary area image in the step S207 regardless of the steps S203 and S205 while displaying the image over the multiple displays in the step S201.

Next, if the main controller 130 determines that there is the boundary area image in the step S207, according to one embodiment, the main controller 130 determines whether the boundary area image is a modification-required image that needs to be modified based on an amount of change of image data in the boundary area image. For example, the amount of change of the image data may include an amount of change of chroma or of a frequency for color.

In more detail for the step of determining whether the boundary area image is the modification-required image by the main controller 130, an amount of change of inter-pixel data between an arbitrary pixel in the boundary area image and adjacent pixels is repeatedly calculated while repeatedly changing the arbitrary pixel for another arbitrary pixel. For example, the amount of change of the inter-pixel data between the arbitrary pixel and eight pixels surrounding the arbitrary pixel is calculated, the calculation of the amount of change of the inter-pixel data is repeatedly performed while changing the arbitrary pixel for another arbitrary pixel, and a data change rate of the boundary area image is calculated by using a sum or an average of the repeatedly calculated amount of change of the inter-pixel data in the step S209. Further, whether the boundary area image is the modification-required image is determined based on a result of comparing the calculated data change rate with a first preset threshold change rate. For example, a letter object included in the boundary area image has a relatively higher data change rate than an image object included in the boundary area image. It is because there is a high possibility that a pixel of an image has similar chroma and color to adjacent pixels and there is a high possibility that a pixel of a letter has a significant difference in chroma and color from adjacent pixels like a difference between a white and a black. Therefore, if the data change rate of the boundary area image is higher than the first preset data change rate, the main controller 130 regards that the letter object is included in the boundary area image and determines that the boundary area image is the modification-required image in the step S211. In the step S211, if the letter object is included in the boundary area image, the boundary area image is hereby determined as the modification-required image because that if the application program window 301 is displayed as illustrated in FIG. 3B, a readability for the letter object in the application program window 301 is significantly lowered.

Next, for the boundary area image determined as the modification-required image, the main controller 130 generates and inserts dummy data into a position corresponding to the boundary area.

Figure 4:
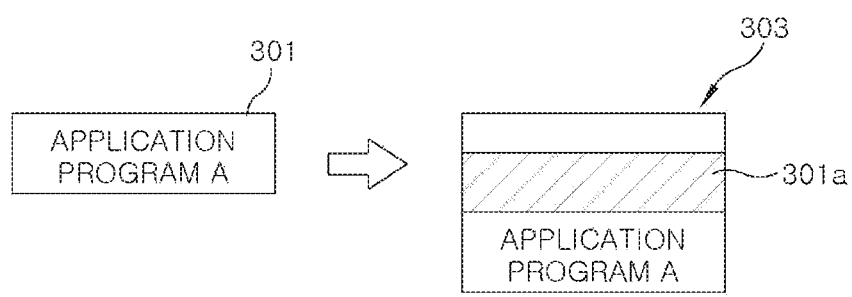
FIG. 4 shows an example of inserting dummy data into a boundary area image according to one embodiment of the present disclosure.

In more detail for the step of inserting the dummy data by the main controller 130, a change rate of the image data for each pixel line parallel to the boundary area is calculated based on the amount of change of the inter-pixel data calculated in the step S209, an insertion position of the dummy data is determined based on a result of comparing the calculated change rate of the image data for each pixel line with a second preset threshold change rate. For example, in terms of a change rate of the image data for the application program window 301 illustrated in FIG. 3B, pixel lines including the letter object "application program A" has a higher value than the other pixel lines excluding the letter object "application program A." The main controller 130 may hereby determine two opposite ends of the pixel lines including the letter object, and a newly modified application program window 303 is generated as illustrated in FIG. 4 by inserting dummy data 301a into the pixel lines including the letter object.

As previously described, the steps S209 and S211 are performed according to one embodiment, however, the steps S209 and S211 may be skipped according to another embodiment. According to the another embodiment, the main controller 130 may generate and insert the dummy data, into the boundary area image, of which position corresponds to the boundary area in the step S213 if determining that there is the boundary area image in step S207.

Figure 3C:
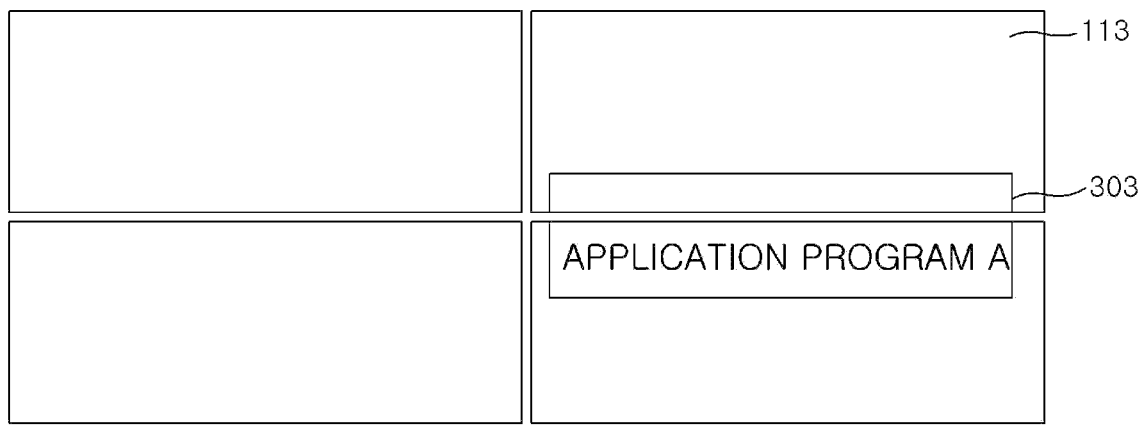

Next, for the boundary area image of which size is increased by the inserted dummy data in the step S213, the main controller 130 controls the image processor 140 to display the object in the boundary area image on a position that does not include the boundary area between the multiple displays included in the display module 113. Further, the image processor 140 distributes the image to display the object in the boundary area image on the position that does not include the boundary area between the multiple displays included in the display module 113. The object in the boundary area image is hereby displayed on the position that does not include the boundary area between the multiple displays included in the display module 113 on the display unit 110. For example, if the dummy data is inserted to extent the application program window 303 in a direction corresponding to the movement of the interaction event based on the boundary area in the step S213, the application program window 303 which is extended in a direction of the dragging input 302 is displayed in the step S215 as illustrated in FIG. 3C.

FIGS. 5A to 5C show examples of a boundary area image stored in a rendering buffer, stored in a display buffer, and displayed on a multi-display device according to one embodiment of the present disclosure.

Referring to FIGS. 5A to 5C, the rendering buffer 142 has physical resolution information on multiple displays with a boundary area (such as bezel) between the multiple displays of the display unit 110. For example, if a display device includes two full HD displays up and down, the display buffer 141 has physical resolution information of 1920× 2160 and the rendering buffer 142 has physical resolution information of 1920×(2160+the boundary area.) In other words, as illustrated in FIG. 5A, the rendering buffer 142 includes information on a position of a boundary area 142a. Therefore, if the dummy data is inserted into the boundary area image in the step S213, an application program window 303 illustrated in FIG. 5A is stored in the rendering buffer 142 of the image processor 140. Further, when data stored in the rendering buffer 142 is transmitted to the display buffer 141, data corresponding to the boundary area 142a is not transmitted and an application program window 303 illustrated in FIG. 5B is stored in the display buffer 141. When the application program window 303 stored in the display buffer 141 is displayed in step S215, as illustrated in FIG. 5C, an object in an application program window 303 is displayed on a position that does not include the boundary area between the multiple displays included in the display module 113. For example, the application program window 303 is divided into two windows and each of the two windows is displayed on respective of a first display and a second display included in the display module 113, but a letter object is displayed on only one display so that a readability get assured.

According to one embodiment as previously described, at the multi-display device, the modification-required image that needs to be modified is selected by analyzing image data to be displayed over the boundary area between the multiple displays adjacently arranged. The readability for the object included in the image data is improved by displaying the modification-required image of which size is increased by the inserted dummy data.

For example, if a document is included in the application program window, which corresponds to the application program running on the computer, displayed on the multi-display device, the application program window is selected as the modification-required image if a letter in the document is to be displayed over the boundary area unless changing the application program window. Further, for the selected modification-required image, the readability is improved by displaying the letter evading the boundary area between the multiple displays.

On the other hand, the controlling for the seamless display module as a prior art is described that if the display module 113 is the seamless display module where the display bar that takes the form of the flexible film is further installed on the boundary area between the multiple displays, the main controller 130 displays a similar color on the display bar to a color of the image displayed on the boundary area. Although the prior art of the controlling for the seamless display module is applied to the changing of the boundary area image according to one embodiment of the present disclosure, the readability for the boundary area is not lowered unlike the prior art. For example, according to one embodiment of the present disclosure, because the letter object is shifted and displayed evading the boundary area when the readability needs to be assured like the situation that the boundary area image includes the letter object, the letter object is not displayed on the display bar taking the form of the flexible film although the controlling for the seamless display module is applied to the boundary area image.

The boundary area image displayed over the boundary area between two displays, among the multiple displays, arranged up and down is previously described as the one embodiment referring to FIGS. 3A to 3C, however, it is obvious that a similar or the same embodiment may be applied to a boundary area image displayed over the boundary area between two displays, among the multiple displays, arranged right and left.

INDUSTRIAL APPLICABILITY

The present disclosure displays image data to be displayed over a boundary area between adjacently arranged displays by changing the image data. A readability for an object included in the image data is hereby improved. The present disclosure may be utilized in a wall-mounted computing device or a tabletop computing device applying a multi-display device including multiple displays.

What is claimed is:

1. A method for displaying an image on a multi-display device including a controller and two or more displays, the method comprising:
    determining, by the controller, whether the image includes a boundary area image to be displayed over a boundary area between a first display and a second display adjacent to the first display;
    determining, by the controller, whether the boundary area image needs to be modified, based on an amount of change of image data in the boundary area image, when the image includes the boundary area image; and
    inserting, by the controller, dummy data into the image so that the image has an increased size and the dummy data is displayed on a position corresponding to the boundary area, when the boundary area image needs to be modified, wherein an insertion position of the dummy data is determined based on the amount of change of the image data.

2. The method of claim 1, wherein the determining whether the image includes a boundary area image determines that the image includes the boundary area image when coordinates of the boundary area are included in an image display range according to overall coordinates information of the image to be displayed on the multi-display device.

3. The method of claim 1, wherein the determining whether the boundary area image needs to be modified comprises:

calculating repeatedly an amount of change of inter-pixel data between an arbitrary pixel, in the boundary area image, and adjacent pixels while repeatedly changing the arbitrary pixel to another arbitrary pixel;

calculating a data change rate of the boundary area image by using a sum or an average of the repeatedly calculated amount of change of inter-pixel data; and determining whether the boundary area image needs to be modified based on a result of comparing the calculated data change rate with a preset threshold change rate.

4. The method of claim 1, wherein the inserting dummy data comprises:

calculating a change rate of the image data for each pixel line parallel to the boundary area based on the amount of change of the image data; and determining the insertion position of the dummy data based on a result of comparing the calculated change rate of the image data for each pixel line with a preset threshold change rate.

5. The method of claim 1, further comprising:

controlling, by the controller, an image processor included in the multi-display device to display, on the first display or the second display, at least one application program window corresponding to at least one application program running on the multi-display device; and monitoring, by the controller, whether an interaction event related to the movement of the application program window occurs, wherein the determining whether the image includes a boundary area image is performed when the interaction event occurs across the boundary area through the monitoring whether an interaction event occurs.

6. The method of claim 5, wherein the inserting dummy data inserts the dummy data to extend the application program window in a direction corresponding to the movement of the interaction event based on the boundary area.

7. A non-transitory computer-readable storage medium including computer-executable instructions, wherein the instructions cause, when executed by a multi-display device including a controller and two or more displays, the controller to perform a method for displaying an image on two or more displays, the method comprising:

determining, by the controller, whether the image includes a boundary area image to be displayed over a boundary area between a first display and a second display adjacent to the first display;

determining, by the controller, whether the boundary area image needs to be modified, based on an amount of change of image data in the boundary area image, when the image includes the boundary area image; and inserting, by the controller, dummy data into the image so that the image has an increased size and the dummy data is displayed on a position corresponding to the boundary area, when the boundary area image needs to be modified, wherein an insertion position of the dummy data is determined based on the amount of change of the image data.

* * * * *